2,868,726
Patented Jan. 13, 1959

United States Patent Office

2,868,726

DRILLING FLUID

John S. Brukner and Clarence O. Walker, Houston, Tex., assignors to The Texas Company, New York, N. Y., a corporation of Delaware No Drawing. Application February 27, 1957
Serial No. 642,643

29 Claims. (Cl. 252—8.5)

This invention relates to the drilling of wells through subsurface formations while employing drilling fluids. More particularly, this invention relates to a drilling operation, such as a rotary drilling operation which involves the circulation of a drilling fluid through the well bore and about the drilling bit, an improved drilling fluid suitable for use in a drilling operation and an additive material suitable for the preparation of said drilling fluid. In a rotary drilling operation a drilling fluid is pumped down the drill stem to the drilling bit at the bottom of the bore hole. The stream of drilling fluid passes through the drilling bit and moves upwardly through the annular space between the drill stem and the well bore wall carrying with it the drilling cuttings.

In some areas, such as in the area of the Gulf Coast of Texas and Louisiana, formations known as heaving or sloughing shales are penetrated during a well drilling operation. The penetration of these formations while employing conventional aqueous or water base drilling fluids has been difficult due to the mud-making characteristics or properties of heaving shales. These shales have a tendency to disintegrate by swelling or cracking upon contact with water with the result that the walls of the bore hole become unstable or incompetent. In some instances the resulting sloughing or moving of the walls of the bore hole into the hole results in a stuck drill stem. In other instances the heaving shale material swells or sloughs or caves into the bore hole with a resulting enlargement of the bore hole and the eventual formation of a large subterranean cavity.

In addition to the above-indicated difficulty of maintaining a true bore hole when drilling through heaving shale with a conventional water base mud, the resulting finely dispersed heaving shale is taken up into the drilling fluid. Because of the mud-making properties of heaving shale the viscosity characteristics of the drilling fluid are adversely affected. Upon the continued accumulation of these finely divided heaving shale particles in the drilling fluid the viscosity of the drilling fluid usually increases excessively with the result that the drilling fluid must be thinned by the addition of costly chemicals thereto or by dilution with water. If the drilling fluid is thinned by water dilution the addition of more weighting material, such as barium sulfate (barytes), iron oxide, lead sulfide (galena) and the like is necessary to maintain a given mud weight.

Special drilling fluids or muds have been developed for drilling through heaving shale formations. One such drilling fluid which has been employed for drilling through heaving shale formations is a drilling fluid containing aqueous sodium silicate. Another drilling fluid which has been proposed for use during a drilling operation while drilling through less seriously dispersing or heaving shale formations is a high pH lime base (mud alkalinity $P_m$ in the range 20–30, more or less) drilling fluid. A high pH lime base drilling fluid, however, cannot be employed without considerable difficulty while drilling through the more seriously heaving shale formations. This fluid also suffers from inadequate high temperature gelation properties, i. e., this mud tends to set up to a hard, almost rocklike material when exposed to relatively high temperatures, e. g., greater than 300° F.

There has recently been developed a very satisfactory drilling fluid or drilling mud for drilling through heaving shale formations. This successful drilling fluid can be briefly characterized as an aqueous drilling mud wherein the aqueous phase (filtrate) is saturated with respect to calcium hydroxide and possesses a relatively high pH, usually in the range 10–12.6, and a relatively high dissolved calcium or calcium ion concentration, at least about 200 parts per million by weight calcium, usually in the range 300–1000 p. p. m. This drilling fluid is more specifically described in copending, coassigned patent application Serial No. 596,456, filed July 9, 1956, in the name of Walter J. Weiss and Wilbur L. Hall, now U. S. 2,803,783 issued August 13, 1957, which is a continuation-in-part application of patent application Serial No. 484,307, filed January 26, 1955, same inventors, now abandoned. The disclosures of the above-referred patent applications are herein expressly incorporated and made part of this disclosure. However, like the conventional high pH lime base muds the above-referred highly successful high calcium content drilling fluid possesses less than desirable high temperature gelation properties.

Accordingly it is an object of this invention to provide an improved drilling fluid particularly suitable for drilling through troublesome shale formations of the heaving, sloughing or rapidly dispersing type and possessing relatively improved high temperature gelation properties.

It is another object of this invention to provide a drilling reagent material suitable for the preparation and/or maintenance of a drilling fluid characterized by a relatively high pH and a relatively high dissolved calcium content and improved high temperature gelation properties.

These and other objects of this invention and how they are accomplished will become apparent in the light of the accompanying disclosure. In at least one embodiment of this invention at least one of the foregoing objects will be achieved.

In accordance with this invention we have provided an aqueous drilling fluid mud particularly suitable for drilling through heaving shale and having improved high temperature gelation properties. More particularly, we have determined that an aqueous drilling fluid or mud of the type described in the above-referred patent application Serial No. 596,456 comprising an alkaline aqueous phase saturated with respect to calcium hydroxide, having a pH less than 12.6 and containing a relatively high dissolved calcium content, that is, a dissolved calcium ion content above about 200 parts per million by weight, is improved particularly with respect to high temperature gelation properties by employing associated therewith an inorganic water soluble metal compound selected from the group consisting of aluminum-containing, chrorium-containing, molybdenum-containing, nickel-containing, cobalt-containing, and iron-containing compounds. The above metal compounds should be water soluble, that is, possess a solubility in water in an amount greater than about 1% by weight of the resulting solution. The inorganic water soluble metal compounds should be ionic in nature, that is, capable of disassociating in water to some extent to yield the corresponding metal-containing ions, either anionic or cationic.

A drilling mud in accordance with this invention would contain water, dispersed hydratable drilling clay material therein, a dispersing agent for said clayey material, a water soluble salt having a solubility in water greater than that of calcium hydroxide, an alkalinity agent such as lime or calcium hydroxide in an amount at least sufficient to insure that the water in the mud is saturated with respect to calcium hydroxide, together with the above-referred water soluble inorganic metal compounds.

A drilling fluid in accordance with this invention may be prepared in the first instance by the addition of a suitable drilling fluid reagent admixture prepared in accordance with the teachings of this invention to water or to water-containing hydratable drilling clay material, together with the addition of the usual drilling mud additives (water loss additive, weighting material, oil, emulsifying agent and the like), if desired; or a conventional aqueous drilling fluid may be treated by the addition thereto of an inorganic water soluble metal compound in accordance with the teachings of our invention, if desired prior to converting the same to a calcium base mud. The inorganic water soluble metal compound, however, may be added to the drilling fluid simultaneously with or subsequent to the addition of the other mud treating agents in accordance with the practice of our invention.

In breaking over a conventional aqueous drilling mud (water base or oil-in-water emulsion mud) to a drilling fluid in accordance with this invention an aqueous drilling fluid containing dispersed hydrated drilling clay material therein is usually thinned in order to reduce the viscosity of the fluid so that upon the addition of the water soluble calcium salt thereto excessive thickening does not occur so that an unpumpable fluid results. It has been found that thinning a clay-water drilling fluid to a value between about 20–30 centipoises as measured at 600 R. P. M. by the Stormer viscosimeter prior to the addition of the water soluble calcium salt thereto usually permits a satisfactory, substantially trouble-free conversion. The added water soluble calcium salt causes a visible thickening of the fluid due to calcium ion flocculation of the hydrated drilling clay material therein. This thickening is not nearly so severe as in the case when lime (which may be quick lime or hydrated lime, calcium hydroxide) alone is added to the drilling fluid. During conversion the water soluble calcium salt is conveniently added to the drilling fluid slightly above the location where the mud ditch flows into the mud pit in order to insure adequate mixing of the added water soluble calcium salt with the drilling fluid or mud prior to the addition of the other materials which are added in accordance with our invention.

After the addition of the soluble calcium salt to the mud or simultaneously therewith when the drilling mud reagent admixture is used, an alkalinity agent, preferably calcium hydroxide (lime) for pH adjustment, a dispersing agent for the clayey material in the mud such as a lignosulfonate, e. g., an alkali metal or an alkaline earth metal lignosulfonate such as sodium lignosulfonate or calcium lignosulfonate commercially available under the trade names Kembreak and Lignox, and a water soluble inorganic metal compound selected from the group consisting of aluminum-containing, chromium-containing, molybdenum-containing, nickel-containing, cobalt-containing and iron-containing compounds, are added to the mud in the pit. After the drilling mud has been thus treated the conventional drilling mud additives such as may be required to control or reduce water loss or to control or increase mud weight are added as needed to maintain the desired mud properties.

Any water soluble calcium salt may be employed in the preparation of a drilling mud or the drilling mud reagent or additive admixture in accordance with the practice of our invention provided the calcium salt is more soluble in water, e. g., as measured at room temperature of about 15° C., than calcium hydroxide $Ca(OH)_2$ and provided the calcium salt when added to water produces or generates the desired free, dissolved calcium or calcium ion content or concentration. Satisfactory water soluble calcium salts which may be employed in the practice of this invention include calcium chloride $CaCl_2$, calcium sulfate $CaSO_4$, calcium acetate $Ca(C_2H_3O_2)_2$, calcium formate $Ca(CHO_2)_2$, calcium nitrate $Ca(NO_3)_2$, calcium gluconate $$Ca(CH_2OH(CHOH)_4COO)_2$$

Other water soluble calcium salts may be employed. The water soluble calcium salt may be any suitable or commercially available form, anhydrous, partially or fully hydrated, flaked, powdered, prilled, lump, granular and the like, the inorganic water soluble salts being preferred.

The alkalinity agent employed in the preparation of a drilling fluid or the drilling mud reagent or additive admixture in accordance with this invention is preferably lime. The lime may be employed in any suitable or commercially available form, anhydrous, partially or fully hydrated, lump, granular, powdered and the like. Lime or calcium hydroxide is advantageously employed since it serves to provide the desired alkalinity in the aqueous phase (an alkaline aqueous phase having a pH not greater than 12.6). Lime also produces or generates dissolved calcium or calcium ions which contribute to the maintenance of the desired, relatively high calcium concentration in the aqueous alkaline phase. Other suitable alkalinity agents are ammonium hydroxide and the alkali metal hydroxides such as caustic soda (NaOH) which in aqueous solution in the presence of added water soluble calcium salt by metathetical reaction produce calcium hydroxide in situ within the drilling fluid, the added water soluble calcium salt being added or present in stoichiometric excess with respect to the alkalinity agent.

Any suitable clay dispersing agent may be employed in the preparation of a drilling fluid or a drilling mud reagent or additive admixture in accordance with the practice of this invention, provided, of course, it is compatible with its environment in the additive admixture and/or in the drilling mud, i. e., it is not salted out and does not undergo a chemical reaction or a physical or chemical change which would render it unsuitable or useless as a dispersing agent therein. Clay dispersing or thinning agents suitable in the practice of this invention include the lignosulfonates, such as the alkali metal lignosulfonates, the alkaline earth metal lignosulfonates and the heavy metal-containing lignosulfonates, e. g., a lignosulfonate containing both iron and chromium. A suitable heavy metal-containing lignosulfonate is Q-Broxin, a ferro-chrome lignosulfonate manufactured by the Puget Sound Pulp and Paper Company of Bellingham, Washington. Other heavy metal-containing lignosulfonates such as iron lignosulfonate, chrome lignosulfonate, nickel lignosulfonate, lead lignosulfonate, copper lignosulfonate, manganese lignosulfonate, molybdenum lignosulfonate, ferro-chrome lignosulfonate or mixtures and complexes thereof are also suitable clay dispersing agents. Other suitable clay dispersing agents are a sodium polymeric polyphenol derivative obtained as an extract of hemlock bark and sold under the tradename Rayflo, and yellow dextrin, a degradation product of starch. Other commercially available dispersing agents are also known.

The drilling fluids may also include the usual water loss additives such as a prehydrolyzed starch commercially available under the tradenames Impermex and My-lo-gel, carboxymethylcellulose (CMC) and the like. It would appear that an oil-in-water emulsion drilling fluid prepared in accordance with this invention would exhibit relatively low water loss properties as compared with an oil-free water base mud also prepared in accordance with the teachings of this invention. Presumably the dispersed emulsified oil phase, usually a diesel oil fraction, inhibits water loss.

The water soluble inorganic metal compound employed in the practice of this invention is present in the mud in a minor amount, usually in an amount less than 10% by weight of the mud, e. g., an amount in the range 0.01–5.0% by weight, more or less, based on the total drilling fluid or mud or additive admixture. Any inorganic water soluble aluminum-containing, chromium-containing, molybdenum-containing, nickel-containing, cobalt-containing and/or iron-containing compound or mixture thereof is suitable in the practice of this invention. Exemplary inorganic, water soluble aluminum-containing compounds include aluminum chloride, potassium aluminate, aluminum nitrate, aluminum sodium chloride and aluminum sulfate. Suitable inorganic, water soluble chromium-containing compounds include ammonium dichromate, chromic bromide, chromic oxide, chromic nitrate, chromic sulfate, chromous chloride, potassium chromate and potassium dichromate. Suitable inorganic, water soluble molybdenum-containing compounds include molybdenum-tetrachloride, molybdenum pentachloride, molybdenum oxychloride, potassium molybdate. Suitable inorganic, water soluble nickel-containing compounds include nickel ammonium chloride, nickel ammonium sulfate, nickel carbonate, nickel chloride ammonia, nickel chloride, nickel nitrate, nickel perchlorate, nickel potassium cyanide and nickel sulfate. Suitable inorganic, water soluble cobalt-containing compounds include cobaltic chloride, cobaltic sulfate, cobaltous ammonium chloride, cobaltous ammonium sulfate, cobaltous bromide, cobaltous fluoride, cobaltous hydroxide, cobaltous iodide, cobaltous nitrate and cobaltous sulfate. Suitable inorganic, water soluble iron-containing compounds include ferrous bromide, ferrous ferrocynanide, ferrous iodide, ferrous perchlorate, ferric bromide, ferric nitrate, ferric chloride, ferric sulfate, ferric thiocyanate and ferrosoferric chloride. As already indicated, the above water soluble inorganic metal-containing compounds may be added alone or in admixture in any suitable proportions per se or together with the other ingredients going to make up a drilling mud in accordance with the practice of this invention.

In accordance with another feature of this invention there is provided a reagent or drilling mud additive admixture, preferably in dry solid form where possible but which also might be in aqueous slurry form, which when added to the drilling fluid which may or may not contain a hydratable drilling clay therein, such as a bentonitic type drilling clay, provides the desired alkalinity, clay dispersing agent and calcium ion content in the drilling fluid to which it is added as well as the desired amount of the water soluble inorganic metal-containing compound. Such a reagent or additive admixture would contain a water soluble calcium salt such as calcium chloride, lime or calcium hydroxide or even caustic soda (NaOH) as the alkalinity agent, a suitable clay dispersing agent such as a lignosulfonate, e. g., Kembreak or Lignox, commercial form of calcium lignosulfonate, together with a suitable amount of a water soluble inorganic metal-containing compound selected from the group consisting of aluminum-containing, chromium-containing, molybdenum-containing, nickel-containing, cobalt-containing and iron-containing compounds. The composition of such an additive admixture containing a water soluble calcium salt such as calcium chloride, an alkalinity agent such as lime or calcium hydroxide, a clay dispersing agent such as calcium lignosulfonate, and one or a mixture of the above-referred water soluble inorganic metal compounds is usually in the weight ratio range 1:2–10:2–10:0.01–2.0, respectively. Preferably in the additive admixture the weight ratio of the alkalinity agent, e. g., lime, to dispersing agent, e. g., Kembreak, is in the range 1:1–1.5. It is realized that the above-indicated weight ratio ranges are open to modification and adjustment depending upon the equivalent or molecular weight of the individual components making up the admixture, e. g., whether the components thereof are employed in anhydrous or hydrated form and depending upon the effective activity of the components employed therein. A reagent or additive admixture containing calcium chloride, lime, a calcium lignosulfonate and a water soluble inorganic chromium-containing, such as chromic oxide, potassium or sodium chromate, chromic sulfate and chromous chloride compound appears to be very useful.

A typical unweighted drilling mud prepared in accordance with this invention by converting a West Cote Blanche Bay hole mud by adding thereto 7 lbs. per barrel of a drilling mud additive containing calcium chloride, lime and a calcium lignosulfonate in the weight ratio range 1:5–6:5–6 together with a suitable effective amount of an inorganic water soluble metal compound described hereinabove, e. g., chromic oxide, chromic chloride, nickel chloride, etc. in an amount in the range 0.1–2 lbs. per barrel would exhibit the following properties:

Mud weight—about 10 lbs. per gallon
Mud solids—approximately 15% by vol.
pH—12.05
$P_f$—0.6
$M_f$—1.3
$P_m$—7.8 to about 10.0
Viscosity, 600 R. P. M. Stormer—40.4 cps.

$P_f$ is defined as number of cc. of $N/50$ $H_2SO_4$ required to titrate 1 cc. of aqueous phase (filtrate) of drilling fluid to a phenolphthalein end point and is a measure of the soluble hydroxyl ion content.

$M_f$ is defined as number of ccs. of $N/50$ $H_2SO_4$ required to titrate 1 cc. of aqueous phase (filtrate) of drilling fluid to methyl orange end point and is a measure of the soluble hydroxyl and carbonate ion content.

$P_m$ is defined as number of ccs. of $N/50$ $H_2SO_4$ required to titrate 1 cc. of the whole mud.

In a drilling mud prepared in accordance with this invention the lime acts primarily as an alkalinity agent to peptize the dispersant, which presumably absorbed on the drilling clay particles, serves to disperse these clay particles. By maintaining the presence of free lime in the subject drilling muds, i. e., maintaining the aqueous phase saturated with respect to lime in the presence of an added dissolved calcium salt (added calcium ion), the pH of the aqueous phase is never greater than 12.6, which value corresponds to the pH of a saturated aqueous solution of lime. The calcium ions originating from the soluble calcium salt added to the drilling fluid causes the pH of the aqueous phase to be somewhat lower than 12.6, generally in a pH range 11.2–12.5, or lower, because of the common ion effect. In the usual practice of this invention drilling fluid is maintained at a pH in the range 11.7–12.2. The calcium ion converts the mud to a calcium base mud and the added inorganic water soluble metal compound improves the high temperature properties of the resulting mud.

It is preferred that in the reagent admixture or in the drilling fluid the weight ratio of lime to dispersing agent be in the range 1–1.5 to the drilling fluid. However, for reasons of economy it would be desirable whenever possible to increase the proportion of lime to dispersing agent ratio to 2:1, or at least 3:2.

The gel strength of the subject muds, like the muds described in the above-mentioned applications, is somewhat different from other conventional muds. For example, phosphate-containing drilling muds have very low initial gel strength but the gel strength of phosphate muds usually continue to rise slowly with time until very high strength, almost rigid, gels are developed. Conventional lime base muds such as a high pH lime-base and wherein the dissolved calcium content seldom rises above 20 to 40 parts per million by weight, exhibit a flash gel which is so flat as to appear to be practically non-existent (0–0) at proper solids, water ratios. The subject muds, however, are distinguishable by possessing an initial gel strength which is very low, the gel strength rising with time to a limited and relatively low value. The rate of gel strength increase or gel formation is moderate and is discernible in a standard ten minute test. The conventionally measured gel strength values of the subject muds normally run about 0–5 grams to 0–30 grams on a 0–10 minute test.

Drilling muds prepared in accordance with this invention can be adjusted to a high mud weight without exhibiting any anomalous reactions. The weighting performance of the subject muds appears to be highly satisfactory and little or no incidental water dilution or increased chemical treating has been required as mud weight is increased. Undoubtedly the apparent ability of the subject muds to satisfactorily maintain a high mud weight in the presence of seriously dispersing heaving or mud-making shales is due to the stability of the clay-water ratio which these muds exhibit because of their excellent shale-suppressing properties.

Drilling muds prepared or converted in accordance with this invention exhibit improved high temperature gelation properties. For example, drilling muds prepared in accordance with this invention and maintained in a quiescent state at a temperature of upwards of 350° F. for a period of at least 66 hours have readily been re-slurried.

When employing the subject muds while drilling through heaving shale it is desirable to maintain the dissolved calcium content or calcium ion content of the aqueous phase (drilling fluid filtrate) at a value greater than 200 parts per million by weight. For example, in actual drilling operations while drilling through seriously heaving shale formations it has been observed that when the calcium content of the filtrate dropped to a value slightly below 200 p. p. m., more particularly to a value of about 185 p. p. m., substantially none of the shale cuttings were being removed on the shaker screen. However, after adjusting the calcium content of the filtrate to a value of about 300 p. p. m. by the addition of a soluble calcium salt such as calcium chloride to the drilling mud, a definite increase in the amount of recovered shale cuttings was noticed. Accordingly, it is preferred while drilling through heaving shale to maintain the dissolved active calcium or calcium ion content available for shale suppression at a value in a range about 300–1000 p. p. m. or more by weight.

The following tests are indicative of the practice of this invention and demonstrate how the high temperature properties of a drilling mud characterized by an aqueous phase saturated with calcium hydroxide and containing a relatively high calcium ion concentration, at least 200 parts per million by weight, are improved by incorporating or otherwise adding or associating with the drilling mud an inorganic water soluble metal-containing compound of the type set forth hereinabove. In the tests an aqueous mud was prepared using a West Cote Blanche Bay hole mud (WCBB) treated with an admixture (ADM) of calcium chloride, lime and a calcium lignosulfonate, in the approximate weight ratio 1:5–6:5–6. To the above mud the above admixture was added in an amount of 8 lbs. per barrel of mud. The thus-treated base mud was then aged for 44 hours at 75° F. Thereupon varying amounts of an inorganic, water soluble metal compound such as aluminum chloride, nickel chloride and chromic oxide were added to portions of the mud and the resulting treated muds again aged and rolled for 64 hours at 140° F. Thereupon the various properties of the resulting muds were tested. These properties of the muds are set forth in accompanying Table I. Following the above treatment the various muds were then bombed at a temperature of 350° F. for about 20 hours and again various properties of the mud were tested. These properties of the mud, which are indicative of the suitability of employing the mud in a drilling operation under conditions which normally give rise for high temperature gelation are set forth in accompanying Table II. As Table II indicates, drilling muds treated in accordance with the practice of this invention by the addition thereto of an inorganic water soluble metal compound have greatly improved high temperature properties as indicated by a substantially reduced sheer value as compared with similar muds not treated in accordance with the practice of this invention.

TABLE I

*Properties of muds before bombing*

| Test No. | Mud Tested | pH | Viscosity | | $P_m$ | $P_f$ | $M_f$ | $Ca^{++}$, p. p. m. |
|---|---|---|---|---|---|---|---|---|
| | | | $V_{600}$ | $V_{100}$ | | | | |
| 1 | 14% WCBB hole mud +8 lbs./bbl. ADM | 12.3 | 10.9 | 27.6 | 13.7 | 1.6 | 2.5 | 1,140 |
| 2 | 14% WCBB hole mud +8 lbs./bbl. ADM+2 lbs./bbl. AlCl$_3$.6H$_2$O. | 12.1 | 24.3 | 107.4 | 8.9 | 0.9 | 1.9 | 1,920 |
| 3 | 14% WCBB hole mud +8 lbs./bbl. ADM+2 lbs./bbl. NiCl$_2$.6H$_2$O. | 12.1 | 22.1 | 105.1 | 10.9 | 1.1 | 1.95 | 1,850 |
| 4 | 14% WCBB hole mud +8 lbs./bbl. ADM+2 lbs./bbl. CrO$_3$. | 12.0 | 16.8 | 62.9 | 7.5 | 0.55 | 3.45 | 2,280 |
| 5 | 14% WCBB hole mud +8 lbs./bbl. ADM+3 lbs./bbl. K$_2$CrO$_4$. | 12.1 | | | 13.5 | 1.8 | 5.4 | 1,620 |

TABLE II

*Properties of muds after bombing 20 hours at 350° F.*

| Test No. | Mud Tested | Shear, lbs./100 ft.$^2$ | pH | $P_m$ | $P_f$ | $M_f$ | $Ca^{++}$, p. p. m. |
|---|---|---|---|---|---|---|---|
| 1 | 14% WCBB + 8 lbs./bbl. ADM | 5,500 | 10.05 | 2.9 | 0.15 | 1.1 | 1,120 |
| 2 | 14% WCBB + 8 lbs./bbl. ADM + 2 lbs./bbl. AlCl$_3$.6H$_2$O. | 1,238 | 10.2 | 1.7 | 0.2 | 1.5 | 2,240 |
| 3 | 14% WCBB + 8 lbs./bbl. ADM + 2 lbs./bbl. NiCl$_2$.6H$_2$O. | 2,625 | 9.6 | 1.3 | 0.2 | 1.4 | 2,000 |
| 4 | 14% WCBB + 8 lbs./bbl. ADM + 2 lbs./bbl. CrO$_3$. | 120 | 9.8 | 0.8 | 0.1 | 1.6 | 1,080 |
| 5 | 14% WCBB + 8 lbs./bbl. ADM + 3 lbs./bbl. K$_2$CrO$_4$. | 100 | 10.6 | 1.3 | 0.3 | 1.9 | 400 |

One of the outstanding properties of a shale control mud prepared in accordance with the teachings of this invention is the ability of the mud, more properly the mud filtrate, to harden or solidify normally heaving shale. This valuable property of the mud or mud filtrate being able to harden shale is not adversely affected by incorporating in the shale control mud in accordance with the teachings of this invention an inorganic, water soluble metal compound. As indicated by the data set forth in accompanying Table III the additions of a water soluble inorganic metal compound does not adversely affect the shale hardening properties of the shale control mud. The base mud employed in these tests was a West Cote Blanche Bay (WCBB) hole mud containing 14% by volume mud solids converted to a shale control mud by the addition thereto in the amount of 8 lbs. per barrel of an admixture (ADM) of calcium chloride and lime and a calcium lignosulfonate in the weight ratio range 1:5–6:5–6, respectively. The shale hardening ability of shale control muds embodying the teachings of this invention was tested against synthetic shale samples which readily disintegrate and disperse on contact with water.

IV and V. These tests clearly showed, as indicated in Table V, that the high temperature properties of the base mud were substantially improved by incorporating in the mud a water soluble metal compound in accordance with the teachings of this invention.

TABLE IV

*Mud properties before bombing*

| Test No. | Mud Tested | pH | Viscosity, $V_{600}$ | $P_m$ | $P_f$ | $M_f$ |
|---|---|---|---|---|---|---|
| 1 | 14% WCBB + 8 lbs./bbl. ADM | 11.98 | 12.0 | 13.9 | 1.1 | 2.4 |
| 2 | 14% WCBB + 8 lbs./bbl. ADM + 1.04 lbs./bbl. Cr added as $CrO_3$. | 11.7 | 20.0 | 8.4 | 1.0 | 4.8 |
| 3 | 14% WCBB + 8 lbs./bbl. ADM + 0.54 lbs./bbl. Al added as $AlCl_3.6H_2O$. | 11.1 | 26.7 | 4.2 | 0.3 | 0.9 |
| 4 | 14% WCBB + 8 lbs./bbl. ADM + 1.15 lbs./bbl. Ni added as $NiCl_2.6H_2O$. | 11.7 | 29.1 | 8.6 | 1.1 | 1.7 |

TABLE V

*Mud properties after bombing for 64 hours at 350° F.*

| Test No. | Mud Tested | Viscosity, $V_{600}$ | Appearance of mud | Shear, lbs./100 sq. ft. | pH | $P_m$ | $P_f$ | $M_f$ |
|---|---|---|---|---|---|---|---|---|
| 1 | 14% WCBB + 8 lbs./bbl. ADM | | Solid, plastic paste | 4,925 | | | | |
| 2 | 14% WCBB + 8 lbs./bbl. ADM + 1.04 lbs./bbl. Cr added as $CrO_3$. | 109.9 | Liquid, high gels | 243 | 9.37 | 0.4 | 0.1 | 1.7 |
| 3 | 14% WCBB + 8 lbs./bbl. ADM + 0.54 lbs./bbl. Al added as $AlCl_3.6H_2O$. | 58.1 | Liquid, medium gels | 0 | 9.76 | 0.4 | 0.1 | 1.7 |
| 4 | 14% WCBB + 8 lbs./bbl. ADM + 1.15 lbs./bbl. Ni added as $NiCl_2.6H_2O$. | 109.0 | Liquid, high gels | 285 | 9.02 | 0.2 | 0.05 | 1.3 |

TABLE III

| Test No. | Mud Composition | Shale Hardening Ability [1] |
|---|---|---|
| 1 | 14% WCBB + 8 lbs./bbl. ADM | +3 |
| 2 | 14% WCBB + 8 lbs./bbl. ADM + 2 lbs./bbl. $AlCl_3.6H_2O$. | +3 |
| 3 | 14% WCBB + 8 lbs./bbl. ADM + 2 lbs./bbl. $NiCl_2.6H_2O$. | +3 |
| 4 | 14% WCBB + 8 lbs./bbl. ADM + 2 lbs./bbl. $CrO_3$. | +3 |

[1] Rating for shale hardening ability:
+3 Hardened
+2 Medium hardening
+1 Slight hardening
0 No effect
−1 Slight softening
−2 Medium softening
−3 Dispersed Further indicative of the advantages obtainable in the practice of this invention there were added to samples of a base mud similar to the mud employed in connection with tests set forth with reference to Table III, equivalent amounts of the following cations, trivalent chromium, trivalent aluminum and divalent nickel. Certain properties of the treated muds were then bombed for a period of 64 hours at a temperature of 350° F. and again certain properties of the resulting muds were determined. The results of these tests are set forth in accompanying Tables As will be apparent to those skilled in the art in the light of the foregoing disclosure many modifications, changes and substitutions are possible in the practice of this invention without departing from the spirit or scope thereof.

We claim:

1. An aqueous drilling fluid comprising an alkaline aqueous phase saturated with calcium hydroxide, a water soluble calcium salt which has a solubility in said aqueous phase greater than that of calcium hydroxide dissolved therein to yield a calcium ion concentration in said aqueous phase of at least 200 parts per million by weight, said aqueous phase having a pH not greater than 12.6, and a minor amount in the range of 0.01–10% by weight based on said fluid of an inorganic water soluble metal compound selected from the group consisting of aluminum-containing, chromium-containing, molybdenum-containing, nickel-containing, cobalt-containing and iron-containing compounds.

2. An aqueous drilling fluid comprising a hydratable clayey material dispersed in an alkaline aqueous phase saturated with calcium hydroxide, a dispersing agent for said clayey material, a water soluble calcium salt which has a solubility in said aqueous phase greater than that of calcium hydroxide dissolved therein to yield a calcium ion concentration in said aqueous phase of at least 200 parts per million by weight, said aqueous phase having a pH not greater than 12.6, and a minor amount in the range of 0.01–10% by weight based on said fluid of an inorganic water soluble metal compound selected from the group consisting of aluminum-containing, chromium-containing, molybdenum-containing, nickel-containing, cobalt-containing and iron-containing compounds.

3. A drilling mud in accordance with claim 2 wherein said inorganic water soluble metal compound is sodium chromate.

4. A drilling mud in accordance with claim 2 wherein said inorganic water soluble metal compound is a chromium-containing compound.

5. A drilling mud in accordance with claim 2 wherein the concentration of calcium ion in said aqueous phase is in the range 300–1000 parts per million by weight and wherein said inorganic water soluble metal compound is an aluminum-containing compound.

6. A drilling mud in accordance with claim 2 wherein the concentration of calcium ion in said aqueous phase is in the range 300–1000 parts per million by weight and wherein said inorganic water soluble metal compound is a nickel-containing compound.

7. A drilling mud in accordance with claim 2 wherein the concentration of calcium ion in said aqueous phase is in the range of 300–1000 parts per million by weight and wherein said inorganic water soluble metal compound is a molybdenum-containing compound.

8. A drilling mud in accordance with claim 2 wherein the concentration of calcium ion in said aqueous phase is in the range of 300–1000 parts per million by weight and wherein said inorganic water soluble metal compound is an iron-containing compound.

9. A water base drilling mud comprising an alkaline aqueous phase having a pH in the range 11.2–12.5, a hydratable drilling clay dispersed in said aqueous phase, a dispersing agent for said clay and a minor amount in the range 0.01–10% by weight based on said mud of an inorganic, water soluble metal compound selected from the group consisting of aluminum-containing, chromium-containing, molybdenum-containing, nickel-containing, cobalt-containing and iron-containing compounds, said aqueous phase comprising a saturated aqueous solution of calcium hydroxide and a water soluble calcium salt which has a solubility in said aqueous phase greater than that of calcium hydroxide dissolved therein to yield a calcium ion concentration in said aqueous phase of at least 200 parts per million by weight.

10. A drilling mud in accordance with claim 9 wherein said dispersing agent is a lignosulfonate.

11. A drilling mud in accordance with claim 9 wherein said dispersing agent is calcium lignosulfonate.

12. A drilling mud in accordance with claim 9 wherein said calcium salt is calcium chloride.

13. A drilling mud in accordance with claim 9 wherein said metal compound is potassium chromate.

14. A drilling mud in accordance with claim 9 wherein said metal compound is aluminum chloride.

15. A drilling mud in accordance with claim 9 wherein said metal compound is a nickel chloride.

16. A drilling mud in accordance with claim 9 wherein said metal compound is an iron chloride.

17. A drilling mud in accordance with claim 9 wherein said metal compound is a chromium-containing compound selected from the group consisting of alkali metal and alkaline earth metal chromates.

18. A drilling mud in accordance with claim 9 wherein the pH of said aqueous phase is in the range 11.7–12.2, wherein said dispersing agent is calcium lignosulfonate, wherein said calcium salt is calcium chloride, wherein said aqueous phase contains a calcium ion concentration in the range 300–1000 parts per million by weight and wherein said metal compound is a chromium-containing compound.

19. A drilling mud in accordance with claim 9 wherein said inorganic water soluble metal compound is sodium chromate.

20. In the drilling of a bore hole through a heaving shale formation wherein a drilling fluid is passed through the bore hole in contact with the heaving shale formation during the drilling operation the improvement which comprises contacting said heaving shale formation with an aqueous drilling fluid comprising an alkaline aqueous phase having a pH not greater than 12.6, said aqueous phase comprising a saturated aqueous solution of calcium hydroxide, a water soluble calcium salt which has a solubility in said aqueous phase greater than that of calcium hydroxide dissolved therein to yield a calcium ion concentration of at least 200 parts per million by weight, and a minor amount in the range of 0.01–10% by weight based on said fluid of a water soluble inorganic metal compound selected from the group consisting of aluminum-containing, chromium-containing, molybdenum-containing, nickel-containing, cobalt-containing ad iron-containing compounds.

21. In the drilling of a bore hole through a heaving shale formation wherein a drilling mud is passed through the bore hole in contact with the heaving shale formation during the drilling operation the improvement which comprises contacting said heaving shale formation with an aqueous drilling mud comprising a hydratable clayey material dispersed in an alkaline aqueous phase having a pH not greater than 12.6, a dispersing agent for said clayey material, said aqueous phase comprising a saturated aqueous solution of calcium hydroxide, a water soluble calcium salt which has a solubility in said aqueous phase greater than that of calcium hydroxide dissolved therein to yield a calcium ion concentration of at least 200 parts per million by weight, and a minor amount in the range 0.01–10% by weight based on said mud of an inorganic water soluble metal compound selected from the group consisting of aluminum-containing, chromium-containing, molybdenum-containing, nickel-containing, cobalt-containing and iron-containing compounds.

22. A method in accordance with claim 21 wherein said drilling mud contains a lignosulfonate as said dispersing agent.

23. A method in accordance with claim 21 wherein said inorganic water soluble metal compound is sodium chromate.

24. A drilling mud additive suitable for use in the preparation of an aqueous alkaline drilling fluid having a pH less than 12.6 consisting essentially of calcium chloride, lime, calcium lignosulfonate and an inorganic water soluble metal compound selected from the group consisting of aluminum-containing, chromium-containing, molybdenum-containing, nickel-containing, cobalt-containing and iron-containing compounds in the weight ratio range 1:2–10:2–10:0.01–2, respectively.

25. An additive in accordance with claim 24 wherein said admixture consists essentially of calcium chloride, lime, calcium lignosulfonate and a water soluble inorganic chromium-containing compound in the weight ratio range 1:2–10:2–10:0.01–2, respectively.

26. An additive in accordance with claim 24 wherein said inorganic water soluble metal compound is sodium chromate.

27. A drilling mud additive consisting essentially of a water soluble calcium salt which has a solubility in water greater than that of calcium hydroxide, lime, a lignosulfonate as a clay dispersing agent and an inorganic water soluble metal compound selected from the group consisting of aluminum-containing, chromium-containing, molybdenum-containing, nickel-containing, cobalt-containing and iron-containing compounds in the weight ratio range 1:2–10:2–10:0.01–2, respectively.

28. A drilling mud additive comprising a water soluble calcium salt which has a solubility in water greater than that of calcium hydroxide, lime, a clay dispersing agent and an inorganic water soluble metal compound selected from the group consisting of aluminum-containing, chromium-containing, molybdenum-containing, nickel-containing, cobalt-containing and iron-containing compounds, the relative proportions of said calcium salt, lime, clay dispersing agent and said metal compound being in the weight range 1:2–10:2–10:0.01–2, respectively.

29. A drilling mud additive in accordance with claim 28 wherein said inorganic water soluble metal compound is sodium chromate.

References Cited in the file of this patent

UNITED STATES PATENTS

| | | |
|---|---|---|
| 2,167,455 | Hirschmann | July 25, 1939 |
| 2,336,595 | Cannon | Dec. 14, 1943 |
| 2,491,436 | Barnes | Dec. 13, 1949 |
| 2,605,221 | Hoeppel | July 29, 1952 |
| 2,636,857 | Bergman | Apr. 28, 1953 |
| 2,802,783 | Weiss et al. | Aug. 13, 1957 |